US011366561B2

(12) United States Patent
Kocharlakota et al.

(10) Patent No.: US 11,366,561 B2
(45) Date of Patent: Jun. 21, 2022

(54) SYSTEMS AND METHODS FOR WINDOW CONTROL IN VIRTUAL REALITY ENVIRONMENT

(71) Applicant: Samsung Electronics Co., Ltd., Suwon-si (KR)

(72) Inventors: Sridhar Kocharlakota, Cupertino, CA (US); Moiz Sonasath, Sunnyvale, CA (US); Brett Foster, Moon Bay, CA (US); Keshav Byri, Mountainhouse, CA (US); Kuldeep Modi, San Jose, CA (US); Nalena Santiago, San Francisco, CA (US); Siva Boggala, San Jose, CA (US); Siva Penke, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/993,221

(22) Filed: Aug. 13, 2020

(65) Prior Publication Data

US 2020/0371646 A1    Nov. 26, 2020

Related U.S. Application Data

(63) Continuation of application No. 15/611,677, filed on Jun. 1, 2017, now Pat. No. 10,747,386.

(51) Int. Cl.
*G06F 3/0481* (2022.01)
*G06F 3/01* (2006.01)
(Continued)

(52) U.S. Cl.
CPC ............ *G06F 3/0481* (2013.01); *G06F 3/012* (2013.01); *G06F 3/013* (2013.01); *G06F 3/0482* (2013.01);
(Continued)

(58) Field of Classification Search
CPC .......... G06F 3/011; G06F 3/012; G06F 3/013; G06F 3/0481; G06F 3/0482;
(Continued)

(56) References Cited

U.S. PATENT DOCUMENTS 7,747,965 B2   6/2010   Holecek et al.
8,358,321 B1   1/2013   Weidner
(Continued)

FOREIGN PATENT DOCUMENTS

CN   105009039 A   10/2015
EP   2990852 A1   3/2016
(Continued)

OTHER PUBLICATIONS

Hwang, Wu-Yuin, and Shih-Shin Hu. "Analysis of peer learning behaviors using multiple representations in virtual reality and their impacts on geometry problem solving." Computers & Education 62 (2013): 308-319 (Year: 2013).*
(Continued)

*Primary Examiner* — Chong Wu

(57) ABSTRACT

Methods, devices, and computer readable media for control of user interface windows in a virtual reality environment. The method includes displaying a window in a viewable area of a virtual reality environment on a display of a head mountable device (HMD), the viewable area determined based on orientation of the HMD. The method further includes receiving a request to lock a position of the window in the viewable area and locking the position of the window in the viewable area in response to the lock request. The position of the window is fixed in the viewable area relative to the orientation of the HMD, when locked, regardless of the orientation of the HMD.

26 Claims, 9 Drawing Sheets

(51) Int. Cl.
  *G06F 3/0483* (2013.01)
  *G06F 3/0482* (2013.01)
(52) U.S. Cl.
  CPC .. *G06F 3/0483* (2013.01); *G06F 2203/04803* (2013.01); *G06F 2203/04804* (2013.01)
(58) Field of Classification Search
  CPC ......... G06F 3/0483; G06F 2203/04803; G06F 2203/04804; G06T 19/003; G06T 19/006
  USPC ........................................................ 345/589
  See application file for complete search history.

(56) References Cited

U.S. PATENT DOCUMENTS

| | | | | |
|---|---|---|---|---|
| 8,856,687 | B2* | 10/2014 | Robertson | G06F 3/04842 715/848 |
| 9,323,518 | B1* | 4/2016 | Savant | G06F 21/562 |
| 10,304,247 | B2* | 5/2019 | King | G06F 3/012 |
| 2002/0044152 | A1* | 4/2002 | Abbott | G06T 19/006 345/629 |
| 2004/0258314 | A1 | 12/2004 | Hashimoto | |
| 2007/0243863 | A1 | 10/2007 | Hong et al. | |
| 2007/0276746 | A1* | 11/2007 | Michonski | G06Q 30/06 705/37 |
| 2012/0026001 | A1 | 2/2012 | Huang et al. | |
| 2012/0062445 | A1 | 3/2012 | Haddick et al. | |
| 2012/0068913 | A1 | 3/2012 | Bar-Zeev et al. | |
| 2012/0092300 | A1 | 4/2012 | Wang et al. | |
| 2012/0327116 | A1 | 12/2012 | Liu et al. | |
| 2013/0021373 | A1 | 1/2013 | Vaught et al. | |
| 2013/0073988 | A1 | 3/2013 | Groten et al. | |
| 2013/0227450 | A1 | 8/2013 | Na et al. | |
| 2013/0265425 | A1* | 10/2013 | Smailus | G01C 23/00 348/148 |
| 2014/0143642 | A1 | 5/2014 | Cameron et al. | |
| 2014/0152558 | A1 | 6/2014 | Salter et al. | |
| 2014/0285404 | A1 | 9/2014 | Takano et al. | |
| 2014/0347390 | A1 | 11/2014 | Poulos et al. | |
| 2014/0358816 | A1* | 12/2014 | Kinsey | G06Q 10/10 705/342 |
| 2014/0361976 | A1 | 12/2014 | Osman et al. | |
| 2014/0368533 | A1 | 12/2014 | Salter et al. | |
| 2014/0368535 | A1 | 12/2014 | Salter et al. | |
| 2015/0049018 | A1 | 2/2015 | Gomez | |
| 2015/0153913 | A1 | 6/2015 | Ballard et al. | |
| 2015/0177972 | A1 | 6/2015 | Tsai et al. | |
| 2015/0212322 | A1 | 7/2015 | Moravetz | |
| 2015/0220152 | A1* | 8/2015 | Tait | G02B 27/017 345/156 |
| 2015/0260990 | A1 | 9/2015 | Ueno et al. | |
| 2015/0277699 | A1* | 10/2015 | Algreatly | G06F 3/04815 715/850 |
| 2015/0302652 | A1 | 10/2015 | Miller et al. | |
| 2015/0317053 | A1* | 11/2015 | Baek | G06F 3/04817 715/765 |
| 2015/0317831 | A1 | 11/2015 | Ebstyne et al. | |
| 2016/0006678 | A1 | 1/2016 | Jung et al. | |
| 2016/0054802 | A1 | 2/2016 | Dickerson et al. | |
| 2016/0063762 | A1 | 3/2016 | Heuvel et al. | |
| 2016/0065952 | A1 | 3/2016 | Han et al. | |
| 2016/0077709 | A1* | 3/2016 | Doan | G06F 3/0484 715/804 |
| 2016/0148598 | A1 | 5/2016 | Kim et al. | |
| 2016/0162020 | A1 | 6/2016 | Lehman et al. | |
| 2016/0266386 | A1 | 9/2016 | Scott et al. | |
| 2017/0083208 | A1 | 3/2017 | Hyun et al. | |
| 2017/0169610 | A1 | 6/2017 | King | |
| 2017/0205980 | A1* | 7/2017 | Rainisto | G06F 3/0484 |
| 2017/0249862 | A1 | 8/2017 | Border | |
| 2017/0336878 | A1* | 11/2017 | Iyer | G06F 3/0346 |
| 2018/0034867 | A1 | 2/2018 | Zahn et al. | |
| 2018/0082475 | A1 | 3/2018 | Sharma et al. | |
| 2018/0144556 | A1* | 5/2018 | Champion | G06F 3/0346 |
| 2018/0357398 | A1* | 12/2018 | Park | H04M 1/725 |

FOREIGN PATENT DOCUMENTS

| | | |
|---|---|---|
| WO | 2014195816 A2 | 12/2014 |
| WO | 2014209709 A1 | 12/2014 |
| WO | 2016073986 A1 | 5/2016 |
| WO | 2016087974 A1 | 6/2016 |

OTHER PUBLICATIONS

Notification of the First Office Action dated Sep. 27, 2021, in connection with Chinese Application No. 201880035301.4, 20 pages.
Supplementary European Search Report in connection with European Patent Application No. 18809823 dated Jan. 3, 2020, 10 pages.
International Search Report and Written Opinion of the International Searching Authority in connection with International Application No. PCT/KR2018/006324 dated Sep. 3, 2018, 14 pages.
Tymes, E., "Running the Setup Wizard in Your Samsung Galaxy S5," http://www.quepublishing.com/articles/artide.aspxp=2254975, Nov. 3, 2014, 7 pages.
Hart, B. "Microsoft Targets Enterprise Virtual Reality with Business Oriented VR Headset" http://www.roadtovr.com/microsoft-enterprise-virtual-reality-business-vr-headset/, Apr. 1, 2014, 4 pages.
Loftus, T. "Mr. Nadella, Where is Office for My Oculus Rift," CIO Journal, http://blogs.wsj.com/cio/2014/03/27/mr-nadella-where-is-office-for-my-oculus-rift/, Mar. 27, 2014, 2 pages.

* cited by examiner

SYSTEMS AND METHODS FOR WINDOW CONTROL IN VIRTUAL REALITY ENVIRONMENT

CROSS REFERENCE TO RELATED APPLICATIONS

This application is a continuation of application Ser. No. 15/611,677, filed Jun. 1, 2017, the disclosure of which is incorporated by reference herein in its entirety.

BACKGROUND

1. Field

This disclosure relates generally to virtual reality environments. More specifically, this disclosure relates to systems and methods for control of user interface windows in a virtual reality environment.

2. Description of Related Art

Virtual reality headsets are increasingly common, and user interfaces for virtual reality headsets present unique opportunities and unique challenges. Head movement tracking and gaze tracking are often used to allow a user to virtually explore the viewable area of a virtual reality display, but may make it difficult to focus steadily on a task.

SUMMARY

Embodiments of the present disclosure provide systems and methods for control of user interface windows in a virtual reality environment.

In one embodiment, a method is disclosed. The method includes displaying a window in a viewable area of a virtual reality environment on a display of a head mountable device (HMD) (also called a head mounted display), the viewable area determined based on orientation of the HMD. The method further includes receiving a request to lock a position of the window on the display and locking the position of the window on the display in response to the lock request. The position of the window is fixed on the display relative to the orientation of the HMD, when locked, regardless of the orientation of the HMD.

In a second embodiment, a HMD is disclosed. The HMD comprises a display and a processor. The processor is configured to cause the display to display a window in a viewable area of a display of a HMD, the viewable area of the display determined based on orientation of the HMD. The processor is further configured to receive a request to lock a position of the window on the display and to lock the position of the window on the display in response to the lock request, wherein the position of the window is fixed on the display relative to the orientation of the HMD, when locked, regardless of the orientation of the HMD.

In a third embodiment, a non-transitory computer-readable medium embodying a computer program is disclosed. The computer program comprises computer readable program code that, when executed, causes at least one processor to cause a display to display a window in a viewable area of a display of a HMD, the viewable area of the display determined based on orientation of the HMD. The computer readable program code, when executed, also causes the at least one processor to receive a request to lock a position of the window on the display and to lock the position of the window on the display in response to the lock request, wherein the position of the window is fixed on the display relative to the orientation of the HMD, when locked, regardless of the orientation of the HMD.

In a fourth embodiment, a HMD is disclosed. The HMD comprises a display and a processor. The processor is configured to execute an application for completing a plurality of tasks. The processor is further configured to generate for display content comprising a plurality of windows, each of the windows corresponding to at least one of the tasks, wherein at least one of the plurality of windows is displayed in a viewable area of the display, and wherein the at least one window is displayed based on an orientation of the HMD. The processor is also configured to, in response to a change in the orientation of the HMD, cause the display to display other of the windows for other of the tasks in the viewable area.

In a fifth embodiment, a non-transitory computer-readable medium embodying a computer program is disclosed. The computer program comprises computer readable program code that, when executed, causes at least one processor to execute an application for completing a plurality of tasks on a HMD. The computer readable program code, when executed, also causes the at least one processor to generate for display content comprising a plurality of windows, each of the windows corresponding to at least one of the tasks, wherein at least one of the plurality of windows is displayed in a viewable area of a display, and wherein the at least one window is displayed based on an orientation of the HMD. The computer readable program code, when executed, further causes the at least one processor to, in response to a change in the orientation of the HMD, cause the display to display other of the windows for other of the tasks in the viewable area.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that users of virtual reality headsets may use head movement tracking and gaze tracking to facilitate intuitive navigation of the viewable area of a virtual reality environment. The virtual reality environment may be generated by a display component or processor of a virtual reality headset. The head movement tracking and gaze tracking may be used in conjunction with the very large potential viewing area of the virtual reality environment (up to a 360 degree view) to lay out different productivity tasks that a user can easily move between to focus on. It is understood that viewable area refers to a portion of the virtual reality environment that is shown on the display of the virtual reality headset at a given time. While use of head movement and gaze tracking can be very useful and intuitive to navigate a large virtual reality environment (e.g., by panning the viewable area around the virtual reality environment), a user may sometimes want to focus on a specific task without moving the viewable area. Head movement and gaze tracking can make it difficult to keep the viewable area still to focus on productivity tasks (such as word processing or data entry) or media viewing.

Accordingly, the present disclosure includes systems and methods to allow a person using a virtual reality device to lock certain tasks in place within the viewable area of the virtual reality environment. For example, the user may wish to lock a particular user interface element (such as a window) in place within the viewable area while still being able to move the viewable area around the window using head movement and gaze tracking. In another embodiment, the user may wish to lock the viewable area in place and ignore head movement and gaze tracking temporarily.

Figure 1:
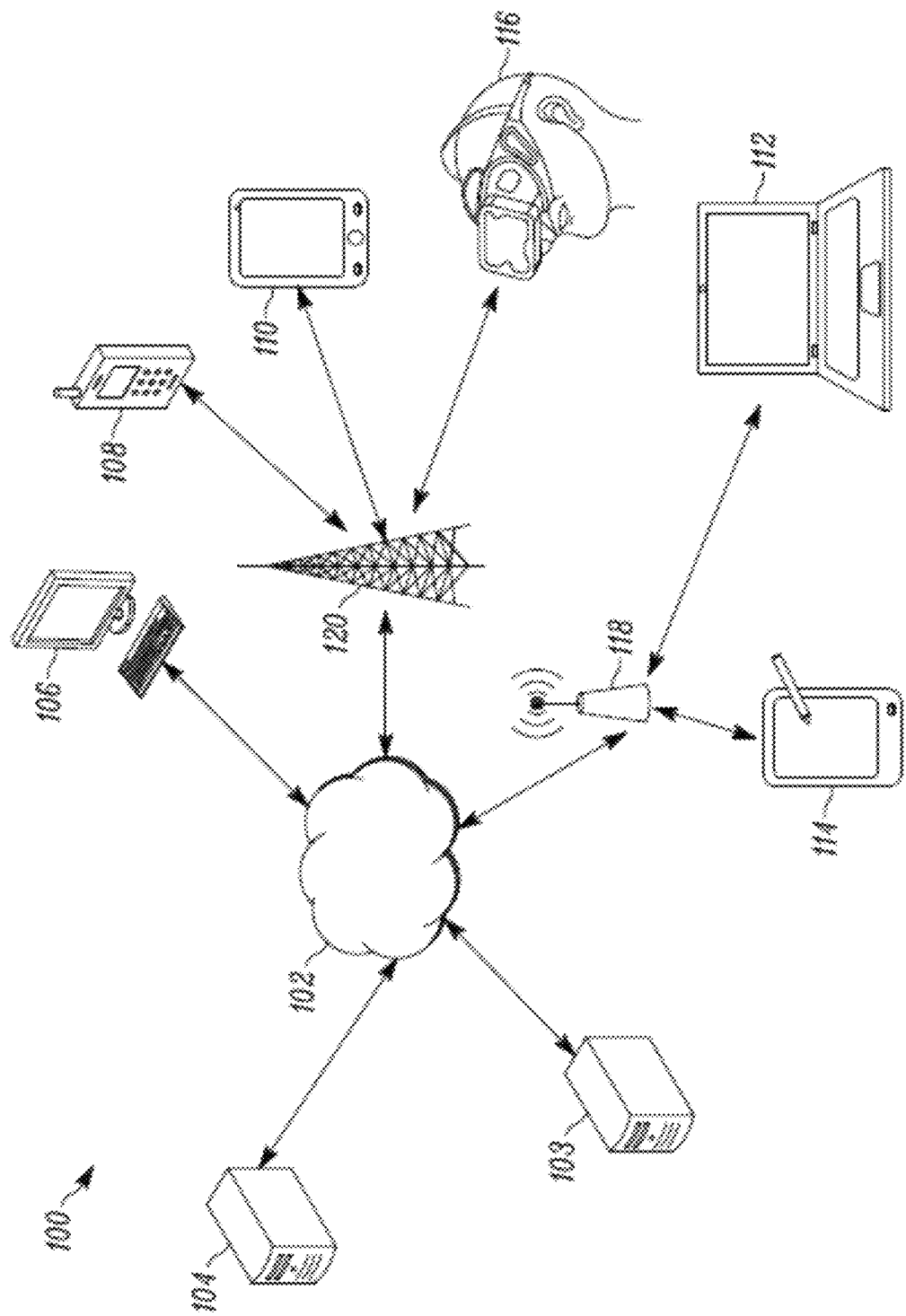
FIG. 1 illustrates an example communication system in which an embodiment of the present disclosure may be implemented.

FIG. 1 illustrates an example communication system 100 in which an embodiment of the present disclosure may be implemented. The embodiment of the communication system 100 shown in FIG. 1 is for illustration only. Other embodiments of the communication system 100 may be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-116. Each server 104 includes any suitable computing or processing device that can provide computing services for one or more electronic devices. Each server 104 may, for example, include one or more processors, one or more memories storing instructions and data, and one or more network interfaces facilitating communication over the network 102.

Each electronic device 106-116 represents any suitable computing or communication device that interacts with at least one server or other computing device(s) over the network 102. In this example, the electronic devices 106-116 include electronic devices, such as, for example, a desktop computer 106, a mobile telephones or smartphones 108, a personal digital assistant (PDA) 110, a laptop computer 112, a tablet computer 114, a HMD 116, a wearable device, smart watch, etc. However, any other or additional electronic devices may be used in the communication system 100.

In this example, some electronic devices 108-116 communicate indirectly with the network 102. For example, the electronic devices 108-110 and 116 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device may communicate directly with the network 102 or indirectly with the network 102 via any suitable intermediate device(s) or network(s).

As described in more detail below, the HMD 116 performs window control within a virtual reality (VR) environment. For example, the HMD 116 provides a VR environment in which a user experiences a virtual display area than can span up to 360 degrees around the user. Various user interface (UI) elements may be presented in this virtual display area, including windows that contain application information for one or more applications. The user may view only a portion of this display area at any given time, and pan this viewable area around the virtual display area by, for example, moving his or her head. Typically windows in the display area remain in place as the viewable area pans around. However, the HMD 116 is configured to facilitate focusing on one window without panning the viewable area with head movements, or keeping a particular window in the viewable area while panning the viewable area around the virtual display area.

Although FIG. 1 illustrates one example of a communication system 100, various changes may be made to FIG. 1. For example, the system 100 may include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features may be used in any other suitable system.

Figure 2:
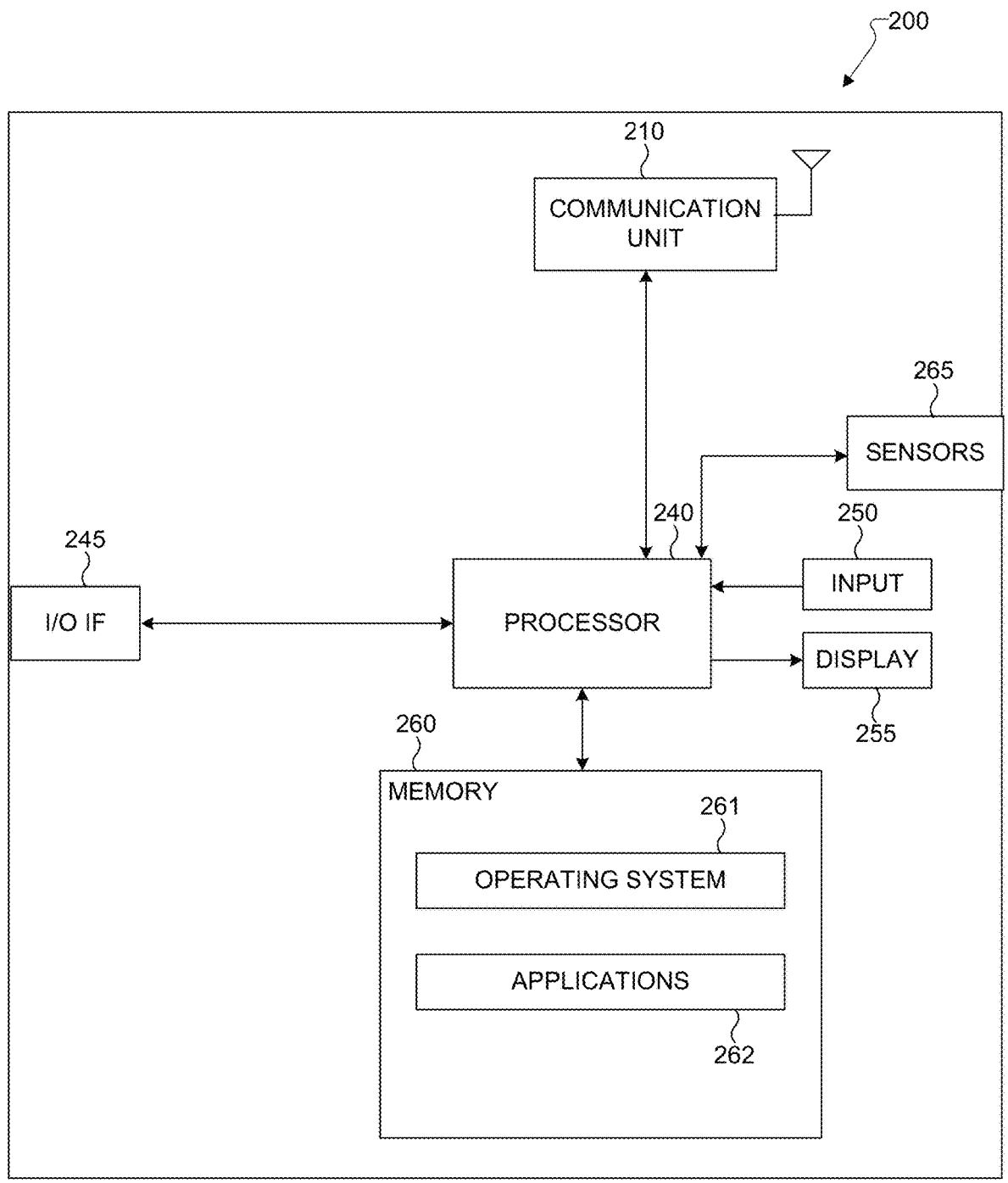
FIG. 2 illustrates a HMD that is capable of facilitating a virtual reality environment according to this disclosure.

FIG. 2 illustrates a HMD 200 that is capable of facilitating a virtual reality environment according to this disclosure. In particular, FIG. 2 illustrates an embodiment of a HMD 116. For example, the HMD 200 could represent a virtual reality headset or a mobile phone designed to be combined with a virtual reality accessory, such as a headset.

As shown in FIG. 2, the HMD 200 includes a communication unit 210 that may include, for example, a radio frequency (RF) transceiver, a Bluetooth® transceiver, or a Wi-Fi® transceiver. The HMD 200 also includes a processor 240, an input/output (I/O) interface (IF) 245, an input interface 250, a display 255, a memory 260, and sensors 265. The memory 260 includes an operating system (OS) program 261 and one or more applications 262. In some embodiments, the HMD 200 also functions as a mobile phone.

The communication unit 210 may receive an incoming RF signal such as a Bluetooth® or Wi-Fi® signal. The communication unit 210 may down-convert the incoming RF signal to generate an intermediate frequency (IF) or baseband signal, then generate a processed baseband signal by filtering, decoding, and/or digitizing the baseband or IF signal. The communication unit 210 transmits the processed baseband signal to the processor 240 for further processing (such as for web browsing data, online gameplay data, notification data, or other message data).

The communication unit 210 also receives analog or digital voice data or other outgoing baseband data (such as web data, e-mail, or interactive video game data) from the processor 240. The communication unit 210 encodes, multiplexes, and/or digitizes the outgoing baseband data to generate a processed baseband data or IF signal. In the case that the communication unit 210 is an RF transceiver, the communication unit 210 up-converts the baseband or IF signal to an RF signal that is transmitted via an antenna.

The processor 240 can include one or more processors or other processing devices and execute the OS 261 stored in the memory 260 in order to control the overall operation of the HMD 200. For example, the processor 240 could control the reception of forward channel signals and the transmission of reverse channel signals by the communication unit 210 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS 261 or in response to signals received from sensors 265 or an input of commands from a user via input interface 250. The processor 240 is also coupled to the I/O interface 245, which provides the HMD 200 with the ability to connect to other devices such as laptop computers and handheld computers. The I/O interface 245 is the communication path between these accessories and the processor 240.

The processor 240 is also coupled to the input interface 250 and the display 255. The user of the HMD 200 can use the input interface 250 to enter data into the HMD 200. The input interface 250 may further include buttons, switches, a microphone, or the like that allow input of commands to the HMD 200. The display 255 may be a liquid crystal display, light emitting diode (LED) display, organic light emitting diode (OLED) display, or other display capable of rendering a virtual reality environment, including rendering text and/or graphics in the virtual reality environment, such as application windows.

The memory 260 is coupled to the processor 240. Part of the memory 260 could include a random access memory (RAM), and another part of the memory 260 could include a Flash memory or other read-only memory (ROM).

The sensors 265 detect information external to the HMD 200 and relay it to the processor 240 for further processing. For example, the sensors 265 may include accelerometers, gyroscopes, magnetometers, cameras, or the like to detect motion of the device (e.g., inertial measurement unit (IMU)). The sensors 265 may also include gaze tracking sensors that detect where a user of the HMD 200 is looking (i.e., what the user's eyes are directed towards) within a viewable area of the display 255. In some embodiments, these sensors 265 allow the processor 240 to provide an immersive, simulated virtual reality environment through the display 255 by providing the illusion of motion to the user based on sensed head and eye movements. The sensors 265 may also be used to facilitate window control, for example by initiating locking and unlocking of windows within the virtual reality environment, as will be further described below.

Although FIG. 2 illustrates an example of an HMD, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In addition, as with computing and communication networks, electronic devices and computer systems can come in a wide variety of configurations, and FIG. 2 does not limit this disclosure to any particular HMD.

Figure 3:
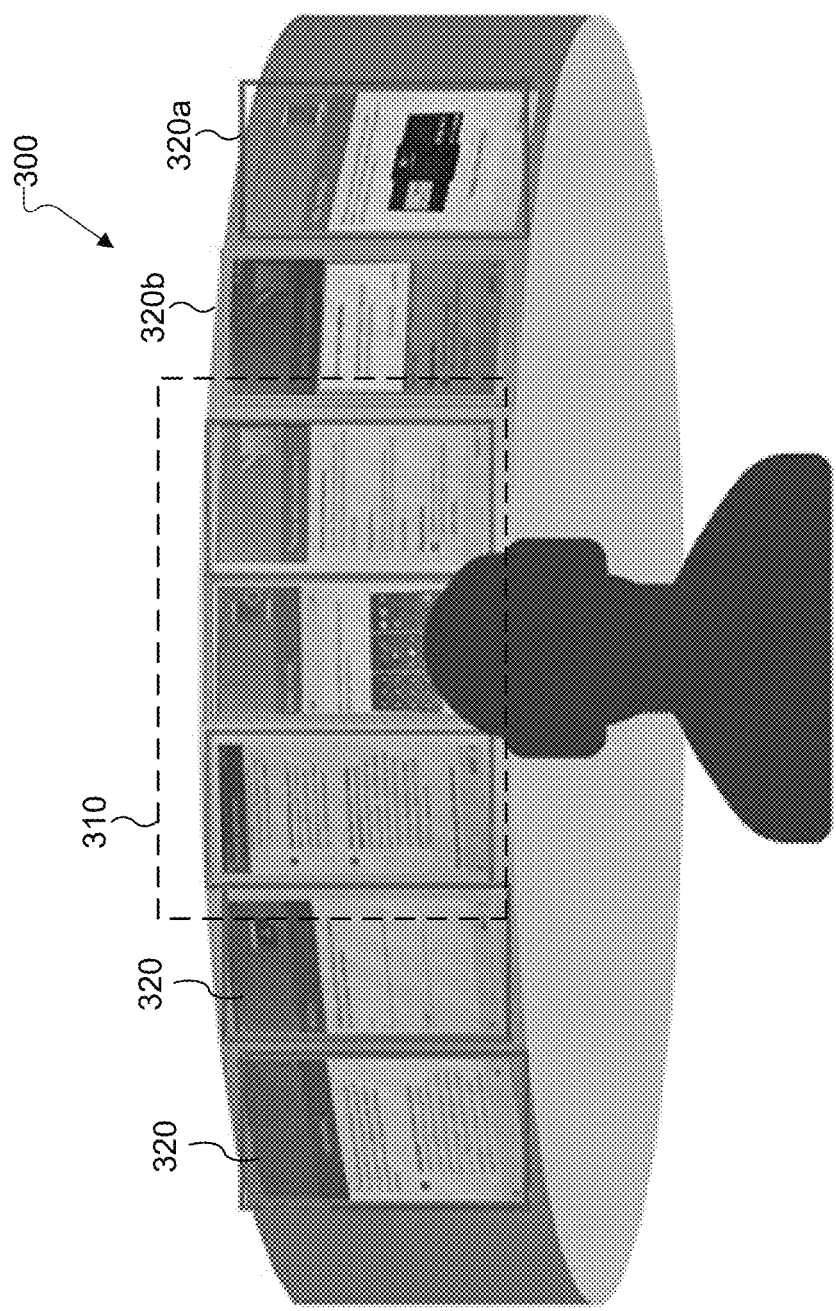
FIG. 3 illustrates an example display of the HMD according to illustrative embodiments of the present disclosure.

FIG. 3 illustrates an example virtual reality environment 300 of the HMD 200 according to illustrative embodiments of the present disclosure. It should be noted that the illustration shown in FIG. 3 and subsequent figures is related to the perception of a user. The aspects shown on the physical display 255 may be shown stereoscopically (e.g., an image shown to a user's left eye and an image shown to a user's right eye, but perceived as a single image by the user). In this embodiment, the HMD 200 is a head mountable device. The virtual reality environment 300 is generated by, for example, display 255 or processor 240 of the HMD 200. According to an example, only a viewable area 310 may actually be displayed by the display 255 of the HMD 200 at any given time, but the movement of the HMD, detected by sensors 265 may cause the viewable area 310 to pan side to side along an arc of the virtual reality environment 300. In some embodiments, the field of view of the viewable area 310 may be adjusted to increase or decrease the amount of the virtual reality environment displayed in the viewable area 310, for example by zooming in or zooming out. In some embodiments, the virtual reality environment 300 is a virtual arc, and in some embodiments the virtual reality environment 300 is a virtual sphere or semi-sphere, allowing the user to pan the viewable area 310 in two dimensions.

A plurality of windows 320 are displayed on the virtual reality environment 300. In some embodiments, these windows are application windows for various applications such as a word processor, a spreadsheet editor, a calculator, a media player, or the like. Such windows may be represented in the virtual reality environment as approximately two dimensional windows that are floating in the three dimensional virtual reality environment 300. In some embodiments, other objects, such as three dimensional virtual objects, are displayed on the virtual reality environment 300 along with the windows 320. For example the virtual reality environment 300 could represent a virtual world generated by an application, and windows 320 could be generated by the same application (for example, menu windows for controlling the application), or by other applications such as a word processing application.

In some embodiments, multiple of the windows 320 are related to the same application. The windows 320 could represent different tasks related to the same application. For example, the windows 320 could represent pages of a setup process for the HMD 200. The large size of the virtual reality environment 300 can allow all steps of the setup to be displayed concurrently on the virtual reality environment 300 such that the user can look over all of the information needed for the setup process without having to navigate back and forth between the pages in one window.

In some embodiments, the windows 320 that represent related tasks of a same application may have a visual indicator associated with them to indicate whether the task contained in the window is mandatory or optional to complete the overall process (e.g., setting up the HMD 200 upon its first use or configuring hardware or software, etc.). A window 320*a* represents a window containing a mandatory task, and has a red border indicating that the task is mandatory. A window 320*b* represents a window containing an optional task, and has a green border indicating that it is optional. While the exemplary embodiment uses red and green borders as indicators, other colors or indicators may be used, including various icons, transparent overlays, etc.

In some embodiments where multiple of the windows 320 are related to the same application, inputs to one of the windows 320 can cause inputs in other of the windows 320. For example, where multiple of the windows 320 are related to a device setup application, or to a user account setup application, a user may input a user name, contact information, payment information, or the like into one window 320, and fields in other windows 320 that request the same information are automatically populated with this information. In this way, input can be minimized in the virtual reality environment 300, where text input may be inconvenient.

In some embodiments where multiple of the windows 320 are related to the same application, the windows 320 contain sequential portions of a long document, allowing the user to view multiple pages of the document at his leisure by simply moving his head side to side to pan the viewable area 310 across the virtual reality environment 300 without having to page back and forth through the document.

Although FIG. 3 illustrates an example of a virtual reality environment 300, various changes could be made to FIG. 3. For example, windows 320 could be arranged in two dimensions, could overlap, could be different sizes, or the like.

Figure 4:
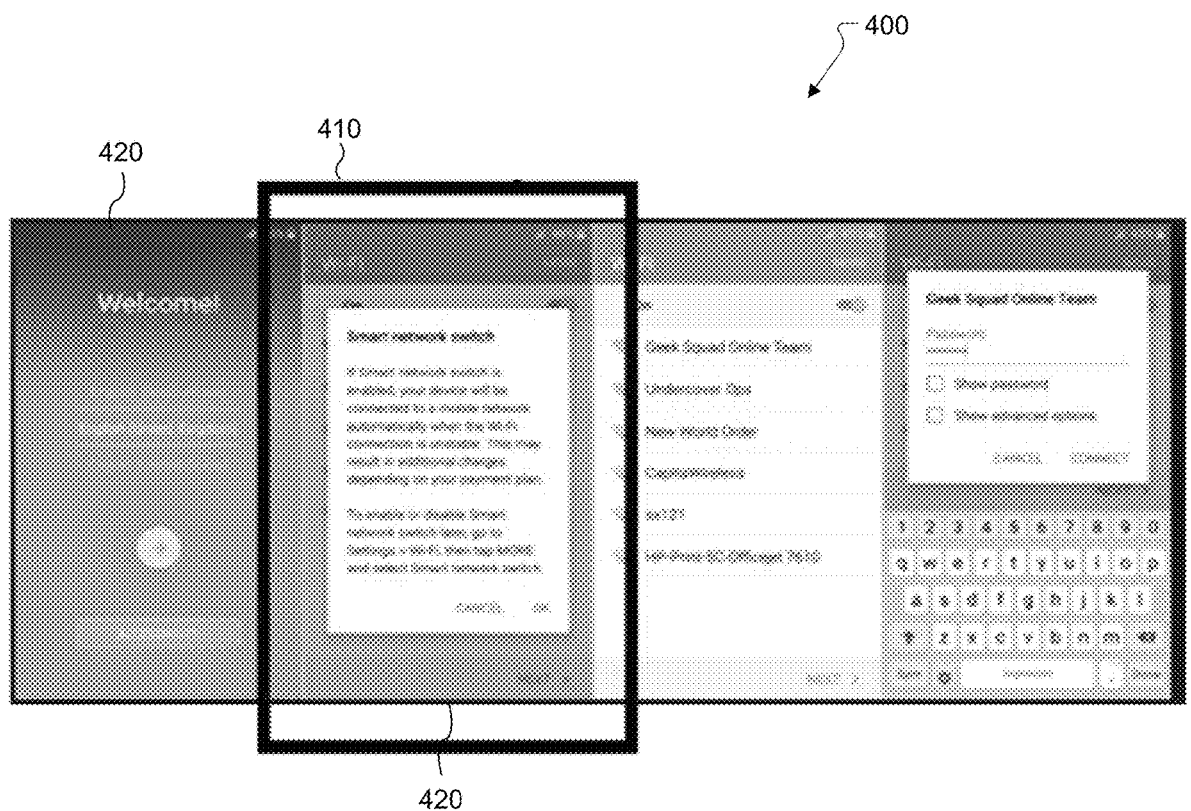
FIG. 4 illustrates an example display of the HMD implementing a window locking process according to illustrative embodiments of the present disclosure.

FIG. 4 illustrates an example virtual reality environment 400 of the HMD 200 implementing a window locking process according to illustrative embodiments of the present disclosure. In some embodiments, the virtual reality environment 400 is the same as the virtual reality environment 300, and the window locking process is implemented in addition to the embodiments described in FIG. 3.

Multiple windows 420 are displayed on the virtual reality environment 400. In some embodiments, windows 420 are similar to windows 320. A viewable area 410 is the area visible to a user of the HMD 200 at any given time. In some embodiments, viewable area 410 is similar to viewable area 310. In this embodiment, only one of the windows 420 is visible in the viewable area 410 at a time, but it is understood that windows 420 may be resized, and multiple windows 420 may be present in viewable area 410.

As described above, the viewable area 410 may be panned within the virtual reality environment 400 when movement of the HMD is detected by sensors 265, such as when a user moves their head. Alternatively or additionally, the viewable area 410 may be panned based on where the user is looking, via gaze or eye tracking. However, when the user wishes to concentrate on a task, movement of the viewable area 410 may be distracting. For example, while watching a movie or television within the virtual reality environment, the user may wish the virtual reality environment 400 to function like a movie screen. As another example, while the user is focusing on a productivity task such as editing a document in a word processor, movement of the window 420 within the viewable area 410 may make focus difficult. Accordingly, the user may wish to lock the viewable area 410.

Locking the viewable area 410 may include ignoring input from sensors (such as motion or gaze tracking sensors) that would normally cause the viewable area 410 to move or pan within the virtual reality environment 400. Locking the viewable area 410 could include locking a window 420 in place relative to the viewable area 410, such that the viewable area 410 can still be panned within the virtual reality environment 400, but the locked window 420 will stay in the same relative position within viewable area 410 as it pans. In other embodiments, the locked window 420 may be expanded to fill the entire viewable area 410. The window 420 that is locked could be a window 420 that currently has focus within the operating system of HMD 200.

In some embodiments, the user may lock the display via a manual input to the HMD 200. For example, actuating a button or switch or providing voice input through a microphone on the HMD 200 could cause the window 420 to lock. In other embodiments, actuating a button, switch, or the like on an external input device, such as a remote control, connected to the HMD 200 could cause the window 420 to lock.

In some embodiments, the operating system of the HMD 200 could automatically recognize that a user wishes for certain applications to be locked upon opening. For example, the operating system may recognize that when the user opens or launches a media viewing application, the user wishes for the window 420 containing the application to be locked. In some embodiments, a software setting of the operating system that corresponds to an application may allow the user to set any application to lock its window 420 upon opening or launching.

In some embodiments, the operating system of the HMD 200 could keep track of a number of times that a user manually locks a window 420 containing a certain application. For example, the operating system could increment a counter corresponding to the application each time a window 420 containing the application is manually locked. When the value of the counter reaches a certain preset number, the operating system could automatically lock the window 420 containing the application corresponding to the counter when the application is launched in the future. In this way, the operating system can recognize and adapt to the user's preferences for locking windows containing specific applications.

Although FIG. 4 illustrates an example of a virtual reality environment 400, various changes could be made to FIG. 4. For example, windows 420 could be arranged in two dimensions, could overlap, could be different sizes, or the like.

Figure 5:
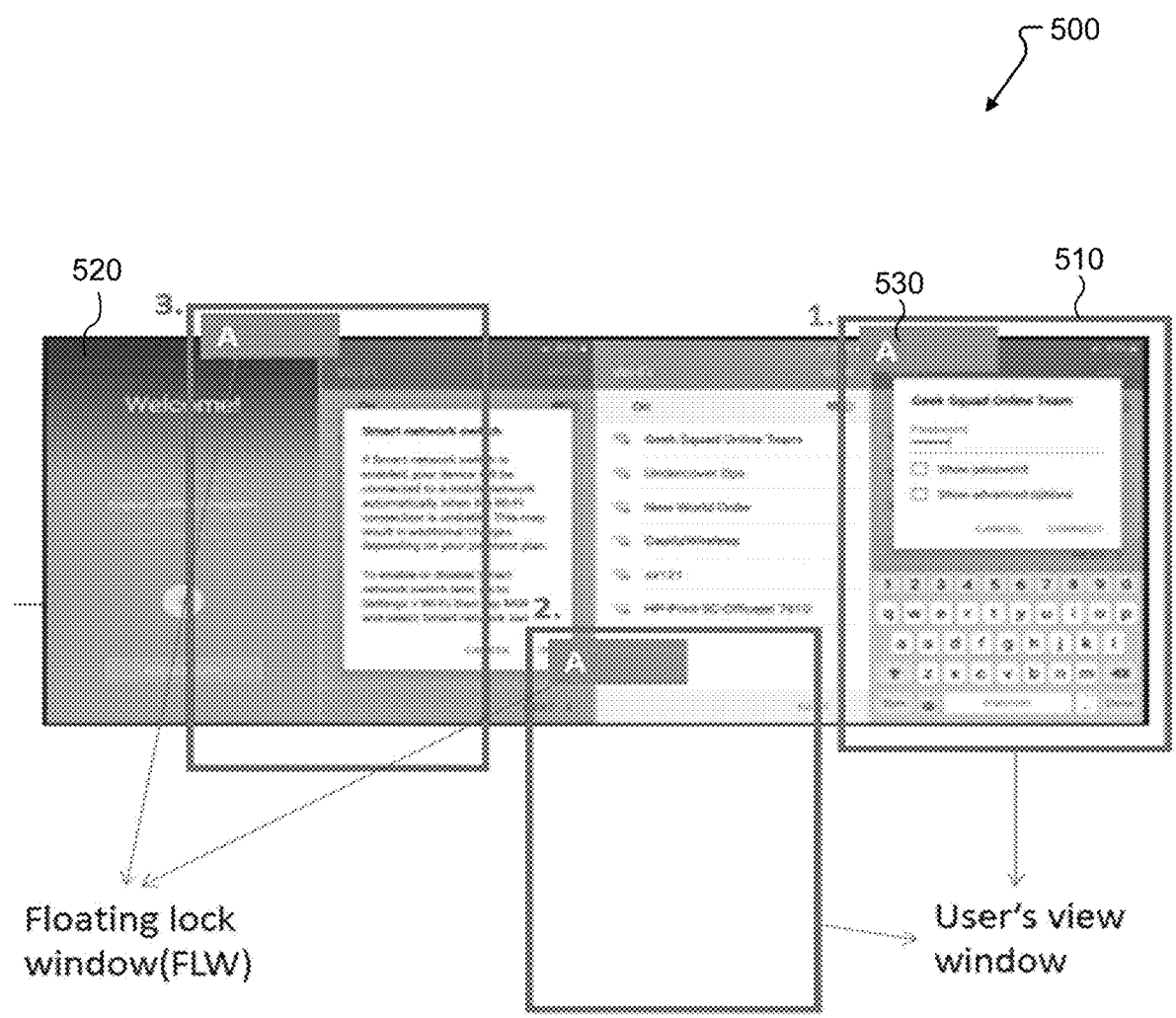
FIG. 5 illustrates an example display of the HMD implementing a floating window locking process according to illustrative embodiments of the present disclosure.

FIG. 5 illustrates an example virtual reality environment 500 of the HMD 200 implementing a floating window locking process according to illustrative embodiments of the present disclosure. In some embodiments, the virtual reality environment 500 is the same as the virtual reality environments 300 or 400, and the floating window locking process is implemented in addition to the embodiments described in FIGS. 3 and 4.

Multiple windows 520 are displayed on the virtual reality environment 500. In some embodiments, windows 520 are similar to windows 320 or 420. A viewable area 510 is the area visible to a user of the HMD 200 at any given time. In some embodiments, viewable area 510 is similar to viewable area 310 or 410.

As described above, the viewable area 510 may be panned within the virtual reality environment 500 when the user moves their head. Alternatively or additionally, the viewable area 510 may be panned based on where the user is looking, via gaze or eye tracking. Movement or panning of the viewable area 510 is illustrated by the different positions of viewable area 510. However the user may wish to have quick access to some pieces of information without needing to pan viewable area 510 to a different part of virtual reality environment 500 that contains the desired information in a window 520. Accordingly, a floating window 530 may be locked in place within viewable area 510 such that the floating window 530 does not move relative to the viewable area 510, even as the viewable area 510 pans around the virtual reality environment 500.

In some embodiments, the floating window 530 may operate as a note pad, allowing a user to "copy and paste" material into and out of the floating window 530. In other embodiments, the floating window 530 may operate as a version of a window 420 containing any other application. For example, floating window 530 may contain a media viewing application, providing a "picture-in-picture" effect as the user continues to perform other tasks that are displayed in the remainder of the viewable area 510.

In some embodiments, the floating window 530 may block the user's view of the viewable area 510 in an undesirable manner. To prevent this, the floating window 530 may become partially or wholly transparent when not actively in use. In some embodiments, the user may provide a manual input to increase or decrease the transparency of the floating window 530. In other embodiments, the operating system may use gaze tracking sensors to automatically determine when the user is looking at the portion of viewable area 510 that contains the floating window 530. When the user is looking at the floating window 530, the operating system may decrease the transparency (or increase the opacity) of the floating window 530 so that it is easily visible. When the user looks away from the floating window 530, the operating system may increase the transparency (or decrease the opacity) of the floating window 530 so that the underlying content of viewable area 510 is visible through the floating window 530.

Although the floating window 530 is shown in an upper left corner of the viewable area 510, it is understood that the floating window 530 could be positioned anywhere within the viewable area 510. In some embodiments, the user may interact with the floating window 530 to move it to a desired position within viewable area 510.

Although FIG. 5 illustrates an example of a virtual reality environment 500, various changes could be made to FIG. 5. For example, windows 520 could be arranged in in other positions beyond a linear arrangement (e.g., multi-row grids, etc.), could overlap, could be different sizes, or the like. As another example, more than one floating window 530 could be present within viewable area 510.

Figure 6:
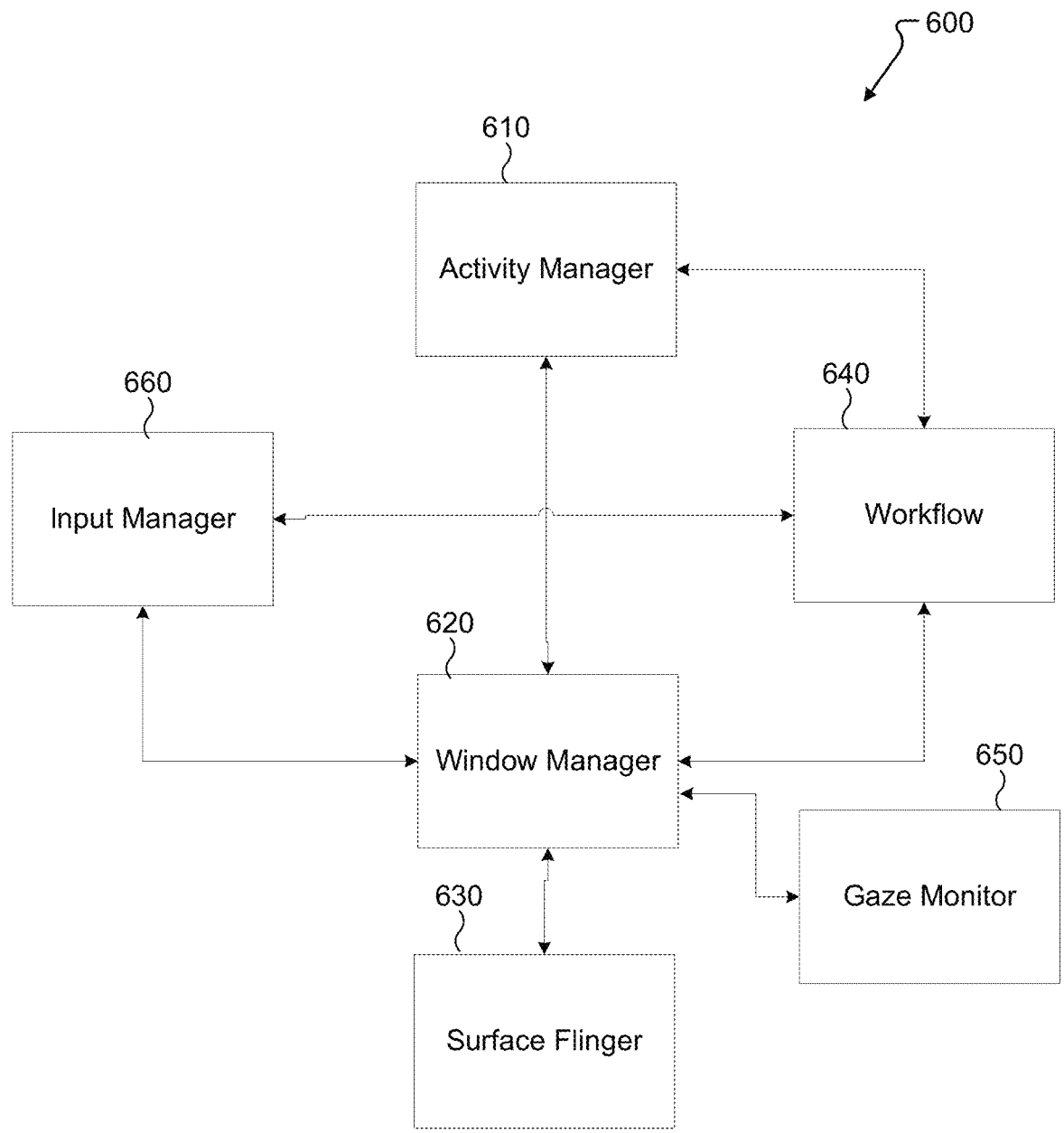
FIG. 6 illustrates an example diagram of architecture for a system handling the display of windows on the display of the HMD.

FIG. 6 illustrates an example diagram of architecture for a system 600 handling the display of windows on the display of the HMD 200. The system 600 may be implemented in software or hardware on the HMD 200. In some embodiments, the system 600 handles rendering and display of windows such as windows 320, 420, and 520 in the virtual reality environment 300, 400, or 500.

An activity manager 610 manages the launch and lifecycle of multiple visible activities, such as applications, at the same time. The window manager 620 manages the arrangement of windows within the viewable area of the display in the virtual reality environment, and manages which windows should currently be visible within the viewable area as the user moves the viewable area around the display. Accordingly, the window manager 620 may manage locking a particular window in the viewable area. The window manager 620 additionally handles assigning focus to windows within the viewable area, and may track the transparency of windows based on whether they are in focus. The surface flinger 630 renders content, such as one or more windows, that should be visible in the viewable area of the display.

The workflow 640 represents an application that contains multiple related tasks that need to be completed by a user. In order to provide multiple related tasks to the user of the device simultaneously, the workflow 640 may function as multiple sub-applications that run simultaneously, each sub-application containing one related task of the overall application. In such embodiments, each sub-application of the workflow 640 is independent, and the tasks of each sub-application may be completed in any order. In some embodiments, some of the sub-application tasks are optional and some are mandatory. Different indicators may be applied to the mandatory and optional tasks so that the user may easily understand which tasks are mandatory and which are optional.

The gaze monitor tracks the eye movement of the user to determine where they are looking within the viewable area of the display. This information may be used by the window manager 620 to determine which window within the viewable area to assign focus to, or to determine a transparency level of a window. The input manager 660 handles manual inputs received from a user, such as button presses, inputs from external controllers, voice commands, head movement of the user, or the like. This information may also be used by the window manager 620 to determine which window to assign focus to or to determine whether to move the viewable area within the display.

Although FIG. 6 illustrates an example of architecture for a system 600, various changes could be made to FIG. 6. For example, more or fewer components may be included in the system 600, the connections between components may change, or the like.

Figure 7:
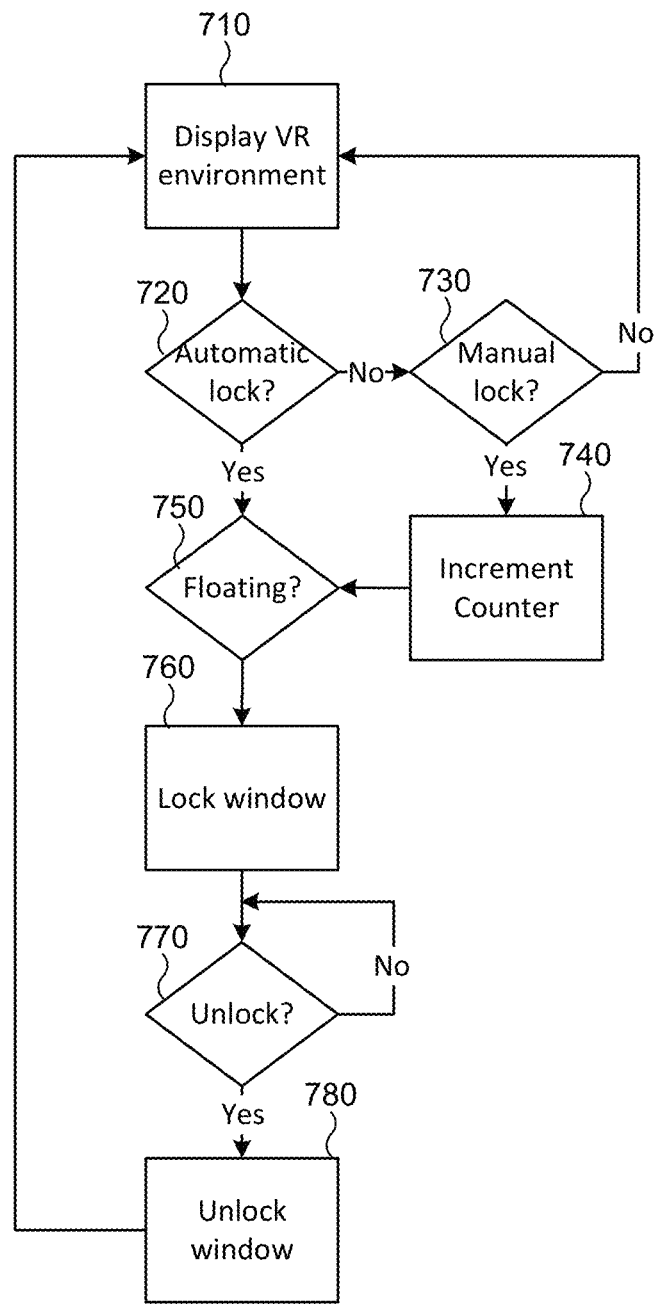
FIG. 7 illustrates an example process for managing windows within a virtual reality environment in accordance with various embodiments of the present disclosure.

FIG. 7 illustrates an example process for managing windows within a virtual reality environment in accordance with various embodiments of the present disclosure. In some embodiments, the process of FIG. 7 may be performed by the HMD 200. In some embodiments, the system 600 of FIG. 6 may be used to implement part or all of the process of FIG. 7.

The process begins with the HMD 200 displaying a VR environment on a display of the HMD 200. For example, at step 710 the HMD 200 may cause one or more windows to be displayed within a viewable area of a display that represents a virtual reality environment. The display may create a virtual display area that extends 360 degrees around the user. The display may also create a virtual display area that forms a sphere or semi-sphere around the user. However, only a portion, or viewable area, of this display is visible to the user at any given time. The HMD 200 renders the virtual reality environment for the user as the user pans the viewable area around within the display area.

When the user causes an application to be launched within a window on the display, the HMD 200 determines whether it should automatically lock the window in place on the display (step 720), as described above. For example, the HMD 200 may determine based on the type of application being launched (e.g., a media viewer, word processor, or spreadsheet editor) that the window containing the application should be locked to the viewable area of the display. Alternatively, the HMD 200 may determine from a user-defined setting corresponding to the application that the application should be locked to the viewable area of the display. Alternatively, the HMD 200 may determine from an activity history for the application, described further below, that the application should be locked to the viewable area of the display.

If the HMD 200 determines not to automatically lock the window containing the application, then the HMD monitors for a user input manually requesting that the window be locked (step 730), as described above. For example, the HMD 200 may detect that the user has pressed a button, switch, or made a voice input requesting that the window be locked. If no manual input is detected requesting that the window be locked, then the HMD 200 continues to operate the application normally in an unlocked window (step 710).

If the HMD 200 detects a manual input at step 730, then it increments a counter corresponding to the application that is running in the window (step 740). This counter may be part of an activity history of the application. When the value of the counter meets a certain threshold, the HMD 200 may, at step 720, recognize that the window should be locked when the application corresponding to the counter is launched in the future.

When the HMD 200 determines whether the window is to be locked, either automatically (as in step 720) or due to manual input (as in step 730), the HMD 200 determines whether the window is to be a floating window or a full viewable area window (step 750). In some embodiments, the HMD 200 may make this determination based on the application (e.g., a notepad application may launch in a floating window, while a word processor launches in a full viewable area window). In some embodiments, the HMD 200 may determine based on the user-defined setting corresponding to the application that it is to launch in a floating locked window. In other embodiments, the manual input received from the user at step 730 may include an indication that the window is to be a floating window.

After determining whether the locked window is to be floating or not, the HMD 200 locks the window (step 760), as described above. If the window is not a floating window, the HMD 200 may ignore user inputs that would normally cause the device to pan the viewable area around the display (e.g., head movement or gaze tracking inputs). In other embodiments, the device could allow panning of the viewable area, but continue to render the locked window in the same relative position within the viewable area (e.g., when the window occupies less than the full viewable area, and when the window is a floating window).

Thereafter, the HMD 200 monitors for an unlock input, which could include a request to unlock the window that was locked at step 760 (step 770). In some embodiments, the unlock input is a manual input from a user, for example an actuation of a button or switch, or voice input through a microphone on the HMD 200. In some embodiments, the unlock input is determined automatically when sensors in the HMD 200 detect head motion over a preset threshold, which may indicate that the user is attempting to intentionally look away from the activity in the locked window. This threshold may be set by the user in any range from 0 to 180 degrees. For example, the user may decide that they will not turn their head more than 45 degrees while focused on one window, and may accordingly set the threshold to 45 degrees. In this case, when head movement greater than 45 degrees is sensed in any direction from a pose (i.e., a particular orientation in 3D space) detected by the HMD 200 when the screen was originally locked, the movement could indicate that the user is trying to intentionally look away from the activity in the locked window, and accordingly that unlocking the window is appropriate. In other embodiments, closure of the application running in the window could be an unlock input.

When the unlock input is not detected, the HMD 200 continues to monitor for the unlock input at step 770. When the unlock input is detected the HMD 200 unlocks the locked window (step 780). In some embodiments, unlocking the window includes acknowledging user inputs that cause the device to pan the viewable area around the display (e.g., head movement or gaze tracking inputs). In other embodiments, when the window is unlocked the device stops rendering the window in the same relative position within the viewable area, instead rendering the window in a fixed position within the display as the user causes the viewable area to pan around the display. In other embodiments, unlocking the window could include closing the application running in the window. At this point, the HMD continues to operate as normal (step 710).

Figure 8:
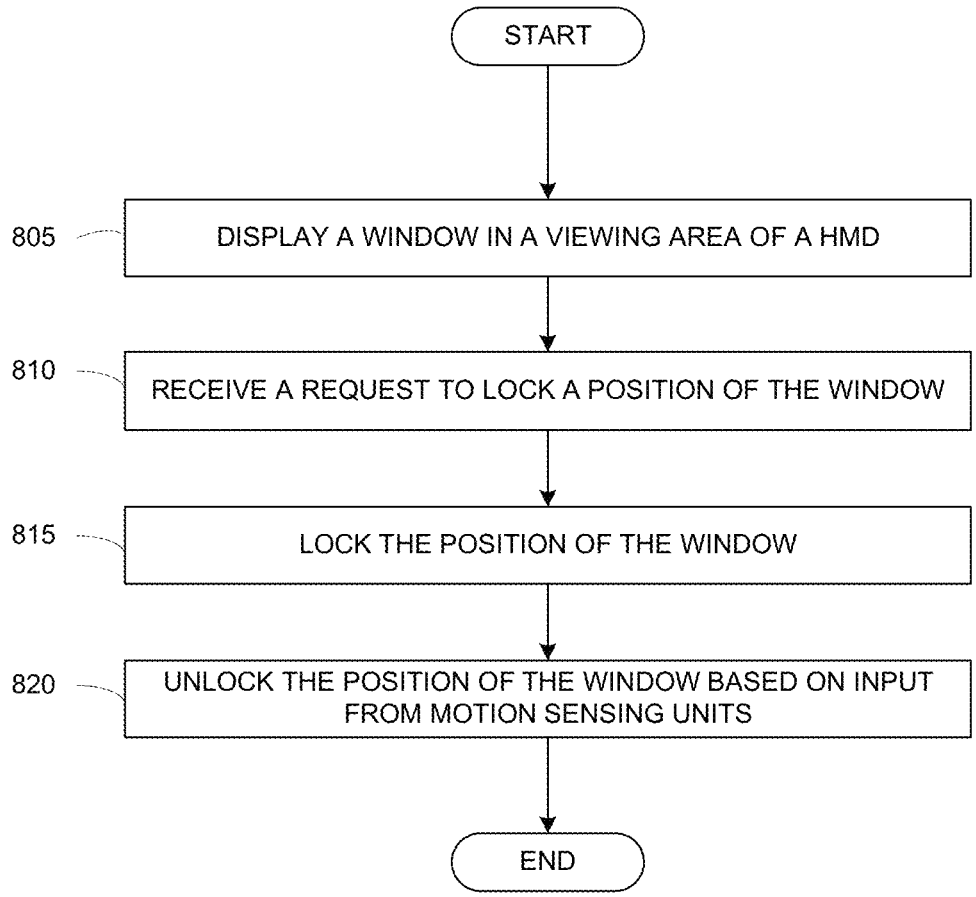
FIGS. 8 and 9 illustrate example processes for window control within a virtual reality environment in accordance with various embodiments of the present disclosure

FIG. 8 illustrates an example process for window control within a virtual reality environment in accordance with various embodiments of the present disclosure. In some embodiments, the process of FIG. 8 may be performed by the HMD 200. In some embodiments, the system 600 of FIG. 6 may be used to implement part or all of the process of FIG. 8.

The process begins with the HMD 200 displaying a window in a viewable area of a display of the HMD 200 (step 805). In some embodiments, in step 805, the viewable area of the display may be determined based on an orientation of the HMD 200, which may be based on information from sensors such as sensors 265. For example, as a user of the HMD 200 moves their head, thereby changing the orientation of the HMD 200, an IMU sensor 265 may determine the orientation of the HMD 200, and the viewable area of the display may be adjusted according to the change in orientation or point of view to provide the user with the sensation of looking around within the VR environment. In some embodiments, the window is displayed on an entirety of the viewable area of the display. In other embodiments, the window is displayed on a portion of the viewable area of the display that comprises less than an entirety of the viewable area of the display. The window may correspond to an application. For example, the window may contain content, such as a UI, from an application such as a word processor, a spreadsheet editor, a media player, or a notepad.

The HMD 200 then receives a request to lock a position of the window (step 810). In some embodiments, in step 810, the HMD 200 may receive the request to lock the position of the window when the window corresponding to the application is first displayed. This may occur, for example, when the application is one which the operating system knows the user would like to focus on without movement of the viewable area to distract the user. This could include applications such as a word processor, spreadsheet editor, or media player. In other embodiments, in step 810, the HMD 200 may receive the request to lock the position of the window via a manual input through an input device, such as input interface 250. For example, the user may press a button, flip a switch, or say a voice command in order to request to lock the position of the window.

Thereafter, the HMD 200 locks the position of the window (step 815). For example, in step 815, the HMD 200 may lock the position of the window on the display so that the position of the window is fixed on the display relative to the orientation of the HMD, when locked, regardless of the orientation of the HMD. In some embodiments, locking the window includes locking the window to the entirety of the viewable area of the display such that the window is the only thing visible in the viewable area of the display.

In some embodiments, locking the window may include disregarding input from motion sensing units of the HMD, for example when the input from the motion sensing units corresponds to the orientation of the HMD. In other words, locking the window may include not moving the viewable area of the display in response to motion sensing inputs that would cause the viewable area of the display to pan around the display if the window were unlocked.

In other embodiments, while the window is locked and the orientation of the HMD is changed, the content displayed in the viewable area of the display is changed while keeping the window displayed at the same position on the display. In these embodiments, the window may be displayed in less than an entire area of the viewable area of the display. In some embodiments, the HMD 200 may determine whether the window that is displayed on a portion of the viewable area of the display has focus (i.e., whether the window is selected by the user). In some embodiments, the HMD 200 may use gaze tracking to determine that the user's gaze is directed at a particular window, and may give that window focus. Gaze tracking may include, for example, using gaze sensors inside the HMD 200 to track the position and movement of a user's eyes. This may be done by, for example, tracking the location of the pupil based on the reflectance difference between the pupil and the rest of the eye. In some embodiments, by processing the distance from the center of the pupil to the edge of the pupil, an angle of the eye relative to the sensors may be determined, and the gaze point or focus point of the eye may be derived from that angle. When the window does not have focus (for example, when the user's gaze is not directed at the window), the HMD 200 may increase the transparency of the window. The window may become completely transparent so that the full viewable area of the display may be used for other activities, or the window may become partially transparent so that the user may view other windows in the area occupied by the window while still viewing the contents of the window. When the window has focus (for example, when the user's gaze is directed at the window), the HMD 200 may decrease the transparency of the window. For example, the window may be made completely opaque so that the user can clearly view the contents of the window, or the window may be made partially opaque so that the viewer can view the contents of the window more clearly than in the transparent state while still viewing other content on the display in the same area as the window.

Additionally, in embodiments wherein locking the window includes not moving the viewing area of the display in response to motion sensing inputs, the HMD 200 may determine to unlock the position of the window based on input from motion sensing units (step 820). For example, in step 820, sensors on the HMD 200 may indicate movement that exceeds a predetermined threshold. Until this threshold is exceeded, the HMD 200 may ignore the input from the motion sensors, but when this threshold is exceeded, the window may unlock. Unlocking the window could include the window remaining in a constant position within the display area as the viewable area moves in response to movement of the HMD 200. In some embodiments, the threshold is 45 degrees from the position at which the window is locked. This could indicate, for example, that the user is attempting to move the viewable area of the display despite the locked window. In other embodiments, the user may set any desired threshold.

Figure 9:
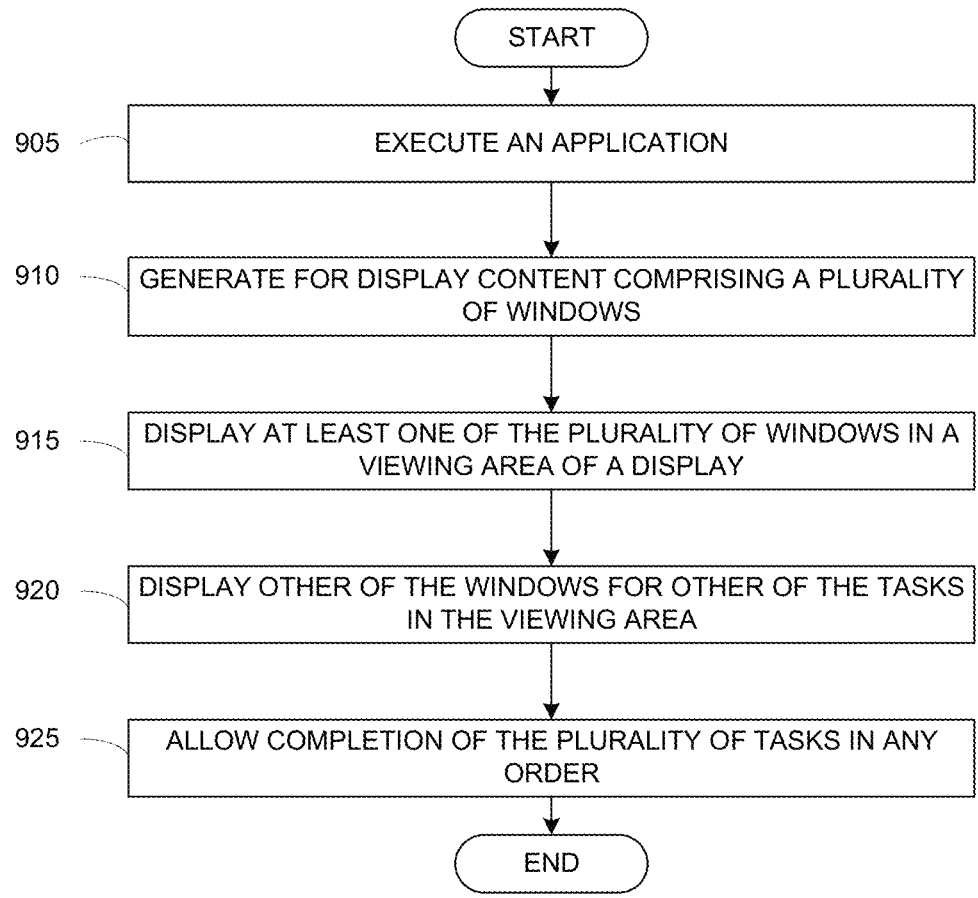

FIG. 9 illustrates an example process for window control within a virtual reality environment in accordance with various embodiments of the present disclosure. In some embodiments, the process of FIG. 9 may be performed by the HMD 200. In some embodiments, the system 600 of FIG. 6 may be used to implement part or all of the process of FIG. 9.

The process begins with the HMD 200 executing an application (step 905). In some embodiments, the application is designed for completing a plurality of tasks. For example, the tasks may include multiple tasks that are component parts of a setup process for the HMD 200. The tasks could also include any set of related tasks of a single application. In other embodiments, the tasks may be unrelated to each other.

The HMD 200 then generates for display content comprising a plurality of windows (step 910). For example, each of the windows may correspond to at least one of the tasks that the application is designed to complete. In other embodiments, some of the windows contain information that is unrelated to tasks that the application is designed to complete. For example, some of the windows may contain descriptive information related to the application.

Thereafter, the HMD 200 displays at least one of the plurality of windows in a viewable area of the display (step 915). In some embodiments, the at least one window is displayed based on an orientation of the HMD 200. For example, the orientation of the HMD 200 may be used by the HMD 200 to determine which portion of the display is within the viewable area, and to determine whether the viewable area contains the at least one window.

In some embodiments, in step 915, the HMD 200 displays in the at least one window a component task that requests input of user account information. The HMD 200 may then receive user account information in response to the requested input, and, using the user account information, complete one or more of the component tasks by entering the user account information. For example, if multiple of the component tasks require the user account information, each of the multiple component tasks may have the account information filled in. In other embodiments, any other information that may be used in multiple component tasks is collected via one window and used in other windows to complete multiple tasks with one input. For example, all information input requests from all component tasks may be collected and consolidated into one component task that is displayed in the at least one window, thus allowing for completion of all information input for all component tasks via one window.

Additionally, the HMD 200 causes the display to display other of the windows for other of the tasks in the viewable area (step 920). For example, in response to a change in the orientation of the HMD that corresponds to the user moving his or her head, the viewable area is changed and other windows are brought into view.

Then, the HMD 200 allows completion of the plurality of tasks in any order (step 925). For example, the tasks may be nominally sequential (e.g., numbered in a sequential order), but their display in multiple windows simultaneously allows for completion out of the nominally sequential order. In some embodiments, multiple of the plurality of windows may contain information needed to complete one task (e.g., instructions), which may be simultaneously viewed while completing the task.

Embodiments of the present disclosure provide systems and methods for control of user interface windows in a virtual reality environment. For example, embodiments of the present disclosure describe managing the locking and unlocking of windows within a viewable area of a virtual reality display. In some embodiments, locking a window includes ignoring user inputs that would normally cause the viewable area to pan around the display, while unlocking restores recognition of those inputs. In some embodiments, locking a window includes rendering the window in the same relative position within the viewable area as the viewable area pans around the display, while unlocking a window includes rendering the window in a fixed position within the display as the viewable area is panned around the display.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for controlling a window at a head mountable device (HMD), the method comprising:
    displaying a plurality of windows concurrently in a viewable area of a virtual reality environment of the HMD, wherein the viewable area is determined based on an orientation of the HMD, and each of the plurality of windows corresponds to an application configured to execute a plurality of tasks for completing a single process, and each of the plurality of windows represents a different task of the plurality of tasks;
    receiving a request to lock a position of a window among the plurality of windows in the viewable area; and
    locking the position of the window in the viewable area in response to the request, wherein the locked position of the window is fixed regardless of the orientation of the HMD,
    wherein a first window of the plurality of windows comprises a first visual indicator to indicate that a particular task of the plurality of tasks represented by the first window is optional, in response to detecting the particular task being an optional task for completing the single process.

2. The method of claim 1, wherein displaying the plurality of windows comprises displaying the plurality of windows on an entirety of the viewable area, and
    locking the position of the window in the viewable area comprises:
    locking the window to the entirety of the viewable area; and
    disregarding input from at least one motion sensing unit of the HMD, wherein the input from the at least one motion sensing unit corresponds to the orientation of the HMD.

3. The method of claim 2, wherein receiving the request to lock the position of the window in the viewable area comprises:
    receiving the request to lock the position of the window when the application is launched.

4. The method of claim 3, further comprising:
    incrementing, each time the request to lock the position of the window corresponding to the application is received, a value of a counter for the application; and
    when the application is being launched and the value of the counter is incremented to a preset number, locking the position of the window corresponding to the application.

5. The method of claim 1, further comprising:
    determining whether the window of which the position is locked has a focus;
    when the window of which the position is locked does not have the focus, increasing a transparency of the window; and when the window of which the position is locked has the focus, decreasing the transparency of the window.

6. The method of claim 1, wherein the window with the locked position is displayed on a portion of the viewable area which is less than an entirety of the viewable area, and
locking the position of the window in the viewable area comprises, when the orientation of the HMD is changed, changing content displayed in the viewable area while keeping the window displayed at the position in the viewable area.

7. The method of claim 1, further comprising: determining to unlock the locked position of the window in the viewable area when input from at least one motion sensing unit of the HMD is movement exceeding a threshold.

8. The method of claim 7, wherein the threshold is configurable within a range of 45-90 degrees from the position at which the window is locked.

9. The method of claim 1, wherein the first window comprises a second visual indicator to indicate that the particular task is mandatory, in response to detecting the particular task being a mandatory task for completing the single process.

10. The method of claim 1, wherein a first input to a second window of the plurality of windows causes an automatic second input corresponding to the first input to a third window of the plurality of windows.

11. A head mountable device (HMD) comprising:
a display; and
a processor configured to:
cause the display to display a plurality of windows concurrently in a viewable area of a virtual reality environment, wherein the viewable area is determined based on an orientation of the HMD, and each of the plurality of windows corresponds to an application configured to execute a plurality of tasks for completing a single process, and each of the plurality of windows represents a different task of the plurality of tasks;
receive a request to lock a position of a window among the plurality of windows in the viewable area; and
lock the position of the window in the viewable area in response to the request,
wherein the locked position of the window is fixed in the viewable area regardless of the orientation of the HMD, and
wherein a first window of the plurality of windows comprises a first visual indicator to indicate that a particular task of the plurality of tasks represented by the first window is optional, in response to detecting the particular task being an optional task for completing the single process.

12. The HMD of claim 11, wherein the plurality of windows are displayed on an entirety of the viewable area, and
the processor is configured to lock the position of the window in the viewable area by:
locking the window to the entirety of the viewable area; and
disregarding input from at least one motion sensing unit of the HMD, wherein the input from the at least one motion sensing unit corresponds to the orientation of the HMD.

13. The HMD of claim 12, wherein the request to lock the position of the window is received when the application is launched.

14. The HMD of claim 13, wherein the processor is further configured to:

increment, each time the request to lock the position of the window corresponding to the application is received, a value of a counter for the application; and
when the application is being launched and the value of the counter is incremented to a preset number, lock the position of the window corresponding to the application when the application is launched.

15. The HMD of claim 11, wherein the processor is further configured to:
determine whether the window of which the position is locked has a focus;
when the window of which the position is locked does not have the focus, increase a transparency of the window; and
when the window of which the position is locked has the focus, decrease the transparency of the window.

16. The HMD of claim 11, wherein the window with the locked position is displayed on a portion of the viewable area which is less than an entirety of the viewable area, and
the processor is configured to when the orientation of the HMD is changed, change content displayed in the viewable area while keeping the window displayed at the position in the viewable area.

17. The HMD of claim 11, wherein the processor is further configured to determine to unlock the locked position of the window in the viewable area when input from at least one motion sensing unit of the HMD is movement exceeding a threshold.

18. The HMD of claim 17, wherein the threshold is configurable within a range of 45-90 degrees from the position at which the window is locked.

19. The HMD of claim 11, wherein the first window comprises a second visual indicator to indicate that the particular task is mandatory, in response to detecting the particular task being a mandatory task for completing the single process.

20. The HMD of claim 11, wherein a first input to a second window of the plurality of windows causes an automatic second input corresponding to the first input to a third window of the plurality of windows.

21. A non-transitory computer readable medium embodying instructions executable by a processor of a head mountable device (HMD) to:
cause a display of the HMD to display a plurality of windows concurrently in a viewable area of a virtual reality environment, wherein the viewable area is determined based on an orientation of the HMD, and each of the plurality of windows corresponds to an application configured to execute a plurality of tasks for completing a single process, and each of the plurality of windows represents a different task of the plurality of tasks;
receive a request to lock a position of a window among the plurality of windows in the viewable area; and
lock the position of the window in the viewable area in response to the request,
wherein the locked position of the window is fixed in the viewable area regardless of the orientation of the HMD, and
wherein a first window of the plurality of windows comprises a first visual indicator to indicate that a particular task of the plurality of tasks represented by the first window is optional, in response to detecting the particular task being an optional task for completing the single process.

22. The non-transitory computer readable medium of claim 21, wherein the plurality of windows are displayed on an entirety of the viewable area, and the instructions are further executable for locking the position of the window in the viewable area by the processor to:

lock the window to the entirety of the viewable area; and disregard input from at least one motion sensing unit of the HMD, wherein the input from the at least one motion sensing unit corresponds to the orientation of the HMD.

23. The non-transitory computer readable medium of claim 22, wherein the request to lock the position of a particular window is received when the application is launched, wherein the instructions are further executable by the processor to:

increment, each time the request to lock the position of the window corresponding to the application is received, a value of a counter for the application;

when the application is being launched and the value of the counter is incremented to a preset number, lock the position of the window corresponding to the application;

determine whether the window of which the position is locked has a focus;

when the window of which the position is locked does not have the focus, increase a transparency of the window; and when the window of which the position is locked has the focus, decrease the transparency of the window.

24. The non-transitory computer readable medium of claim 21, wherein the window with the locked position is displayed on a portion of the viewable area which is less than an entirety of the viewable area, and the instructions are executable by the processor to when the orientation of the HMD is changed, cause the display to change content displayed in the viewable area while keeping the window displayed at the position in the viewable area.

25. The non-transitory computer readable medium of claim 21, wherein the first window comprises a second visual indicator to indicate that the particular task is mandatory, in response to detecting the particular task being a mandatory task for completing the single process.

26. The non-transitory computer readable medium of claim 21, wherein a first input of information to a second window of the plurality of windows causes an automatic second input corresponding to the first input to a third window of the plurality of windows.

* * * * *